R. HOWLAND,
Hub-Attaching Device.
No. 213,425. Patented Mar. 18, 1879.
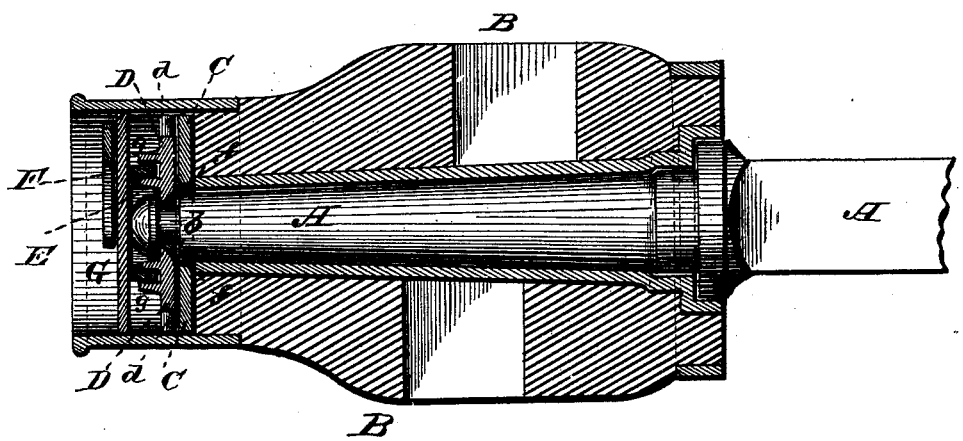
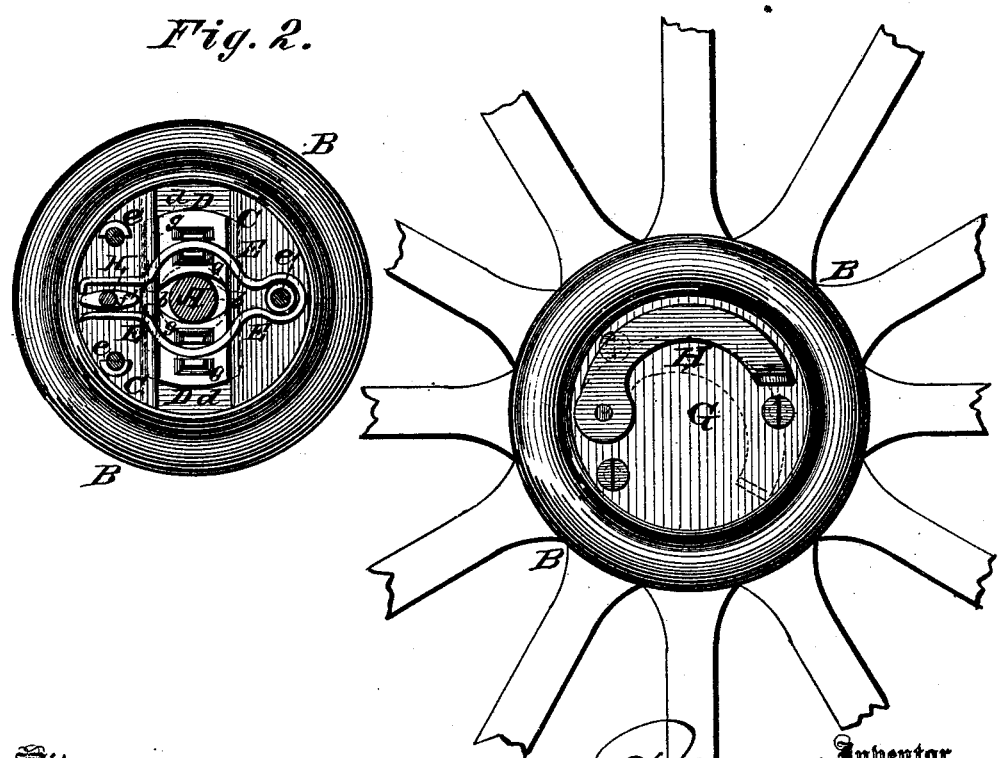

UNITED STATES PATENT OFFICE.

RANSOM HOWLAND, OF ROCK FALLS, ILLINOIS.

IMPROVEMENT IN HUB-ATTACHING DEVICES.

Specification forming part of Letters Patent No. 213,425, dated March 18, 1879; application filed January 28, 1879.

*To all whom it may concern:*

Be it known that I, RANSOM HOWLAND, of Rock Falls, in the county of Whiteside and State of Illinois, have invented certain new and useful Improvements in Attaching Wheels to Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to attaching the wheels of vehicles to the axles thereof.

The object of my invention is to provide a safe and convenient mode of securing the wheel to the axle so as to dispense with a nut, and at the same time close the end of the hub against the leakage of oil or the ingress of dirt or dust.

Figure 1 is a spindle, showing the annular groove $b$ and hub in section. Fig. 2 is a view of the outer end of the hub, with the cap G removed, showing the parts hereinafter named. Fig. 3 is an outside view of the wheel in position.

A is the spindle of an ordinary axle, having the annular groove $b$ near its outer end. B is the hub of a wheel. C is a round metallic plate, having the transverse groove $d$, bosses $e\ e$ and $e'$, and axle-hole $f$. D D are sliding keys, having each the short posts $g\ g$ on their outer plane, and having their inner edges shaped to conform to and traverse the annular groove $b$ in the spindle A, and being dovetailed loosely in the groove $d$, so as to readily move therein. E is a duplex spring, looped at or near its center around the boss $e'$, as shown, and having bowed sides, which pass, respectively, between the short posts $g\ g$ of the sliding keys D D. Between the open ends of the spring E is pivoted the elongated knob $f'$, whose shaft extends through the outer cap, G, and has rigidly attached thereto the lever H.

The operation of my invention is as follows: The plate C, with its adjunctive parts, is screwed to the outer end of the hub B in part by screws passing through the outer cap, G. The spindle A is passed through the axle-hole $f$, the inner edges of the keys D D being slightly beveled to permit its more ready passage. The spring E permits the necessary separation of the keys D D to allow of the insertion of the spindle A between them; but when the groove $b$ is directly between the inner ends of the keys D D, the spring E, engaging such keys between the short posts $g\ g$, throws the keys into the groove $b$ and retains them there, thus preventing the withdrawal of the axle until the keys are released. The parts are so adjusted that the spring E maintains sufficient pressure on the keys D D to hold them in and compel them to traverse the groove $b$, thus preventing the escape of the wheel. As the inner edges of the keys D D do not sufficiently encircle the spindle A to allow such edges to come in contact, any wear of such edges or of the spindle in the groove $b$ is compensated for by the spring E causing the keys D D to approach each other, thus avoiding any rattling, loosening, or severance of the parts, which otherwise might result from such wear. By moving the lever H in the direction indicated by the dotted lines in Fig. 3, the knob $f'$, acting as a cam, widens the spring E, and thereby the keys D D, so as to permit the withdrawal of the spindle A. By means of the bosses $e\ e$ and $e'$ the outer cap, G, when screwed to the hub, is prevented from binding upon or impeding the action of the spring E or keys D D.

What I claim for my invention is that it is a safe, simple, and convenient mode of affixing or removing a wheel; that it precludes the accumulation of grease or dirt at the outer end of the hub; that no wrench or other implement is required to remove or replace the wheel, and that it prevents the escape of the oil used to lubricate the spindle. It also dispenses with the use of washers, and prevents the wear of the wheel on the shoulder of the spindle, because the keys D D, in traversing the groove $b$, prevent any lateral movement of the wheel either in or out. Dovetailing the keys D D into the groove $d$ assists in retaining the latter parts in their relative positions. The parts may be made of any size required.

What I claim as my invention, and desire to secure by Letters Patent, is—

1. The keys D D, having their inner edges partially encircling the spindle A, and provided with lugs $g$ $g$, in combination with the spring E, substantially as described, and for the purpose mentioned.

2. The keys D D, having crescent-shaped inner edges, the knob $f'$, lever H, spring E, and spindle A, in combination, in the manner described, and for the purpose specified.

In testimony that I claim the foregoing as my own I affix my signature in presence of of two witnesses.

RANSOM HOWLAND.

Witnesses:
TRUMAN CULVER,
JAMES PETTIGREW.